United States Patent
Hayashi

(10) Patent No.: US 7,202,980 B2
(45) Date of Patent: Apr. 10, 2007

(54) MOUNTING STRUCTURE FOR INVERTER CIRCUIT BOARD FOR LIGHT SOURCE LAMP OF IMAGE READER

(75) Inventor: Eiichi Hayashi, Saitama (JP)

(73) Assignee: Fujinon Corporation (JP)

( * ) Notice: Subject to any disclaimer, the term of this patent is extended or adjusted under 35 U.S.C. 154(b) by 1010 days.

(21) Appl. No.: 10/106,158

(22) Filed: Mar. 26, 2002

(65) Prior Publication Data

US 2002/0141167 A1 Oct. 3, 2002

(30) Foreign Application Priority Data

Mar. 30, 2001 (JP) ............................. 2001-102631

(51) Int. Cl.
*H04N 1/04* (2006.01)

(52) U.S. Cl. ............... 358/475; 358/474; 358/497; 362/631; 362/632; 250/234; 250/235; 250/216; 250/239; 399/212; 399/220

(58) Field of Classification Search ............... 358/475, 358/509, 483, 482, 497, 494, 472–474, 471, 358/400, 505, 512–514; 399/220, 221, 211, 399/212; 250/208.1, 216, 234–236, 227.11; 362/611, 614, 615, 630–634
See application file for complete search history.

(56) References Cited

U.S. PATENT DOCUMENTS

| 4,390,265 | A  | * | 6/1983 | Suzuki et al. | ................. 399/55 |
| 6,133,565 | A  | * | 10/2000 | Fujimoto et al. | ........... 250/234 |
| 6,445,836 | B1 | * | 9/2002 | Fujiwara | ..................... 382/312 |
| 6,704,126 | B1 | * | 3/2004 | Hayashi et al. | ............. 358/475 |
| 6,879,414 | B2 | * | 4/2005 | Ando | ......................... 358/474 |

FOREIGN PATENT DOCUMENTS

| JP | 06268814 A | * | 9/1994 |
| JP | 10356751 |   | 12/1998 |

* cited by examiner

*Primary Examiner*—Cheukfan Lee
(74) *Attorney, Agent, or Firm*—Price, Heneveld, Cooper, DeWitt & Litton, LLP

(57) ABSTRACT

A mounting structure for an inverter circuit board for a light source lamp of an image reader in which mounting means for mounting the inverter circuit board for a light source lamp of an image reader onto a carriage is located to be operated from the direction in which the carriage moves in one embodiment. The inverter circuit and heat dissipation plate are removably mounted to an end of the full rate carriage. In another embodiment, the circuit board is mounted to the top for access from above the carriage.

10 Claims, 7 Drawing Sheets

MOUNTING STRUCTURE FOR INVERTER CIRCUIT BOARD FOR LIGHT SOURCE LAMP OF IMAGE READER

BACKGROUND OF THE INVENTION

1. Field of the Invention

The present invention relates to a stationary original type image reader and particularly to a mounting structure for a drive circuit for the light source lamp.

2. Description of the Related Art

In image readers such as copying machines, scanners and the like, in which original image data which is displayed on a sheet of paper or the like is read and various processes are carried out, light beams emitted from a fluorescent lamp or other light source is irradiated onto the original. Reflected light beams are incident onto a light receiving station equipped with a photoelectric converter device such as CCD (Charge-Coupled Device) or the like. In the image reader of the original stationary type, while the light source lamp is moved with respect to the original which is placed on the platen glass, the light beams from the light source lamp irradiates the original. In addition, the optical path length from the original to the light receiving station must be kept even when the position of the original being irradiated varies. Reflectors provided for leading the reflected light beams to the light receiving station and an inverter circuit for operating the light source lamp must be moved together with the light source lamp along the original.

The inverter circuit and the light source lamp are mounted on a carriage which is movably provided in the casing of the image reader. A structure for mounting the inverter circuit on the carriage was previously proposed by the applicant of the present invention, in the image reader of Japanese Patent Application No. 11-263025. In this image reader, the inverter circuit is disposed at end portions of the carriage in the longitudinal direction thereof, and further the components of the inverter circuit are divided and disposed at both end portions.

It is sometimes necessary for the light source lamp or the inverter circuit to be replaced because they have reached their life span, or because they have been damaged. In image readers of the prior art, when the inverter circuit and the like have to be replaced, the carriage onto which they are mounted has to be removed from the main body of the image reader, and the part which is to be changed has to be removed from the carriage, and then replaced with the new part. This is because the inverter circuit board is fixed with screws onto the base plate of the carriage. Providing these screws on the roof plate of carriage, and fixing the inverter circuit board thereto has been considered, but the head portion of the screws protrude upward and thus it is necessary to provide a corresponding amount of space for the head portions of the screws, and the distance between the light source lamp and the original is increased, thus reducing the intensity of light which is radiated onto the original.

When the carriage is removed in order to replace the inverter circuit as described above, the wires connected to the carriage for operating the carriage must also be removed and thus the work of removing the circuits is very complex. In addition, when the inverter circuit is mounted once again into the main body, adjustments must be carried out and this further increases the difficulty of the work of replacing the inverter circuit.

Further, as in the image reader proposed in Japanese Patent Application No. 11-263025, when the structure is such that component parts of the inverter circuit are divided and disposed at both end portions of the carriage, the respective component parts which have been divided have to be removed from both ends of the carriage, and thus the work of removing the circuits as well as the work of mounting them may be very complex.

SUMMARY OF THE INVENTION

A main object of this invention is to provide a mounting structure for an inverter circuit board for a light source lamp of an image reader in which the replacement of the inverter circuit can be easily carried out without the need for removing the carriage from the main body without the need for carrying out operational adjustments of the apparatus. Further, it is necessary to irradiate the original with an appropriate amount of light beam from the light source lamp, but in order to do this, it is necessary to carry out adjustment of the light beam intensity by changing the resistance value of a variable resistor. Another object of the invention is to provide a mounting structure for an inverter circuit board for a light source lamp of an image reader in which this adjustment of the light beams amount can be easily carried out.

The technical means for achieving the above objects is the mounting structure for an inverter circuit board for a light source lamp of an image reader according to this invention, in which the image reader comprises a carriage which moves along an original placed on a platen glass. On the carriage is mounted a light source lamp whose light beams are moved along the original such that the original is sequentially irradiated. The light beams reflected from the original are picked up and an image formed on the original is read, wherein mounting means for mounting onto the carriage an inverter circuit board having an inverter circuit for a light source lamp installed thereon, can be operated from the direction in which the carriage moves.

In order to replace the inverter circuit for the light source lamp, the circuit board is removed from either of the directions of movement of the carriage and the inverter circuit replaced. The direction for removing the board is set to be one of the directions of movement of the carriage. Thus, when the inverter circuit is to be replaced, it is not necessary to remove the carriage from the main body, and the work of replacing the inverter circuit is simplified.

Further, in a mounting structure for an inverter circuit board for a light source lamp of an image reader which takes into consideration the dissipation of heat which is generated from the inverter circuit as the luminance of the light source lamp is increased, a heat dissipation plate is mounted to an end portion of the carriage on a side in the direction in which the carriage moves, and the circuit board is removably mounted to the heat dissipation plate.

In recent years, there has been a demand for image data to be picked up more precisely, and for detailed image data to be obtained for dark originals. Thus a high intensity lamp has been used as the light source lamp. As a result the amount of heat generated from the inverter circuit is large and this heat must be effectively dissipated. Dissipation of the heat is accomplished by providing a heat dissipation plate. Also, the heat dissipation plate is mounted at an end portion of the carriage at a side in the direction of movement thereof, and the circuit board can be mounted onto this heat dissipation plate. As a result, the circuit board is attachable and removable from the direction of movement of the carriage, and also the heat generated at the circuit board is effectively dissipated.

In a mounting structure for an inverter circuit board for a light source lamp of an image reader in which the work of adjusting the light beams amount of the light source lamp can be easily carried out, the image reader comprises a carriage which moves along an original placed on a platen glass. On the carriage is mounted a light source lamp whose light beams are moved along the original such that the original is sequentially irradiated, and the light beams reflected on the original is picked up and an image formed on the original is read, and adjusting means are provided for adjusting the intensity of the light beams from the light source lamp in the direction in which the carriage moves.

The intensity of the light beams from the light source lamp can be automatically adjusted in accordance with the lightness or darkness of an image formed on the original, but light beams adjustment is necessary in preparation for this. As a result, means for adjusting the light beams amount, such as a variable resistor, is used in driving the light source lamp. By operating the variable resistor, the light beam intensity can be adjusted. Operation of the light beams amount adjusting means can be carried out from the direction in which the carriage moves. For this reason, adjustment of the light beams amount can be carried out without the need to remove the carriage from the main body of the image reader, and also without the need for removing the inverter circuit board from the carriage.

Further, the complexity of the mounting structure for an inverter circuit board for a light source lamp in which the work of adjusting the intensity of the light beams from the light source lamp is reduced. The image reader comprises a carriage which moves along an original placed on a platen glass, and on the carriage is mounted a light source lamp whose light beams are moved along the original such that the original is sequentially irradiated. The light beams reflected from the original are picked up and an image formed on the original is read. The operation of the adjusting means for adjusting the light beams amount of the light source lamp is carried out from above the carriage.

In particular, in the case where a variable resistor is used as the light beam amount (intensity) adjusting means, the board having the variable resistor assembled thereon, is mounted such that the back surface of the variable resistor is at the upper side, and the resistance value is adjusted through a through-hole formed on the base from the back surface side thereof. As a result, the light beams amount of the light source lamp can be adjusted without the need to remove the carriage from the main body, and without the need to remove the board onto which the light beams amount adjusting means is assembled, from the carriage.

In addition, a mounting structure for an inverter circuit board for a light source lamp in which the replacement of the inverter circuit and the work of adjusting the light beams amount of the light source lamp is reduced. The mounting means for mounting onto the carriage, the inverter circuit board having the inverter circuit, and adjusting means for the light beam source lamp installed thereon can be adjusted from the direction in which the carriage moves.

By the operation of the mounting means of the carriage being carried out from the direction of movement of said carriage, the circuit board can be mounted thereto so as to be removable. In addition, the adjustment of the light beams amount can be carried out in the direction of movement of the carriage or from above the carriage. The light beams amount adjusting means is assembled onto the board which the inverter circuit for the light source lamp is installed, and in the case where the light beams adjustment is carried out from above the carriage, a through-hole is formed in the board and operation is carried out from the back side of the board.

Further, in a mounting structure for an inverter circuit board for a light source lamp for an image reader in which the replacement of the inverter circuit and the work of adjusting the light beams amount of the light source lamp is reduced and which takes into consideration the dissipation of heat which is generated from the inverter circuit as the luminance of the light source lamp is increased, the operation of the light beams amount adjusting means can be carried out in the direction of movement of the carriage or from above the carriage, and a heat dissipation plate is mounted to one end of the carriage at a side in the direction of movement thereof. Because the inverter circuit board is attached to the heat dissipation plate so as to be removable, the inverter circuit board can be operated from the direction of movement of the carriage. Also, because the inverter circuit board of the light source lamp is mounted to the heat dissipation plate, heat generated from the inverter circuit is effectively diffused.

These and other features, objects and advantages of the present invention will become apparent upon reading the following description thereof together with reference to the accompanying drawings.

DETAILED DESCRIPTION OF THE PREFERRED EMBODIMENTS

Figure 7:
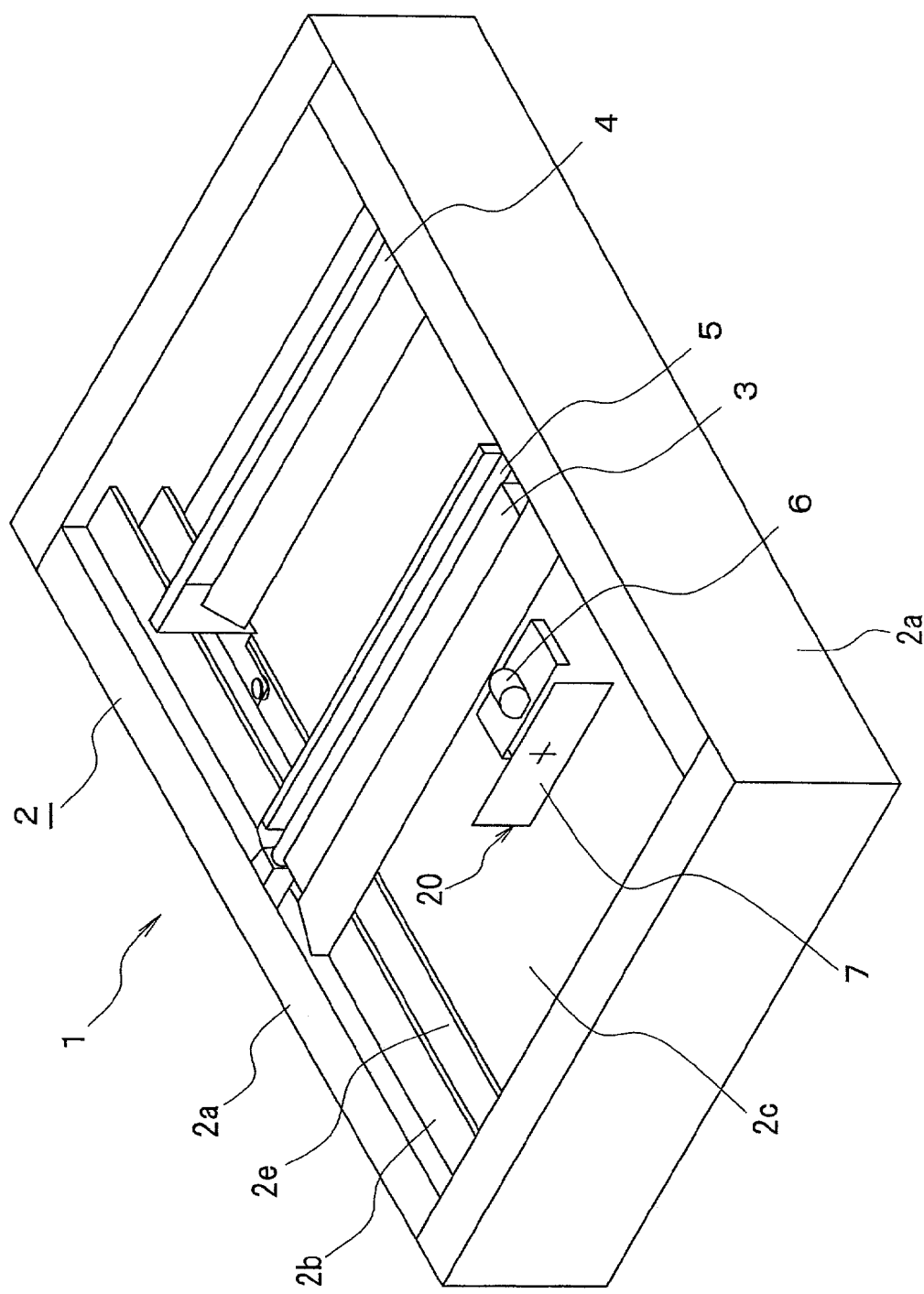
FIG. 7 is a perspective schematic view for of an image reader equipped the carriage having the mounting structure for an inverter circuit board for a light source lamp according to the present invention.

FIG. 7 is a schematic structure of the image reader 1 to which the mounting structure for the inverter circuit board is applied. Two guide plates, 2b and 2e, which are configured as shelves, are provided at the inner surface of walls 2a, which walls 2a extend in the longitudinal direction of a casing 2 of the image reader 1. A full rate carriage 3 and a half rate carriage 4 are respectively placed on the guide plates 2b and 2e and are guided by the guide plates 2b and 2e so as to move in the longitudinal direction of the casing 2. Also, a platen glass (not shown) is mounted on the upper surface of the casing 2, and originals are placed on this platen glass. A light source lamp 5, such as a fluorescent lamp is mounted on the full rate carriage 3. The original is irradiated by the light source lamp 5. In addition, an image focusing lens 6 and a photoelectric converter device 7, such as a CCD (Charge Coupled Device) or the like, are provided at an appropriate position on the bottom plate 2c of the casing 2.

A first reflector (not shown) is provided on the full rate carriage 3, and on the half rate carriage 4, a second reflector and a third reflector (also not shown) are provided, and light emitted from the light source lamp 5 and reflected on the original is reflected in sequence at the first reflector, and then at the second reflector and the third reflector in a conventional manner. The light beams are then transmitted through the image focusing lens 6 and impinge upon the photoelectric converter device 7. An optical path is thus formed by the first reflector and the second and third reflectors, from where the light beams are reflected onto the original until it reaches the photoelectric converter device 7. When the image information on the original is to be read, the entire area of the original must be irradiated. Thus, the full rate carriage 3 is movable along the entire area of the platen glass. The above optical path from the original to the photoelectric converter device 7 is kept at a constant length even though the full rate carriage 3 moves. The optical path is maintained at a constant length by synchronizing the movement of the half rate carriage 4 with that of the full rate carriage 3 under conditions in which the movement of the half rate carriage 4 is set to almost half of the movement of the full rate carriage 3.

Figure 1:
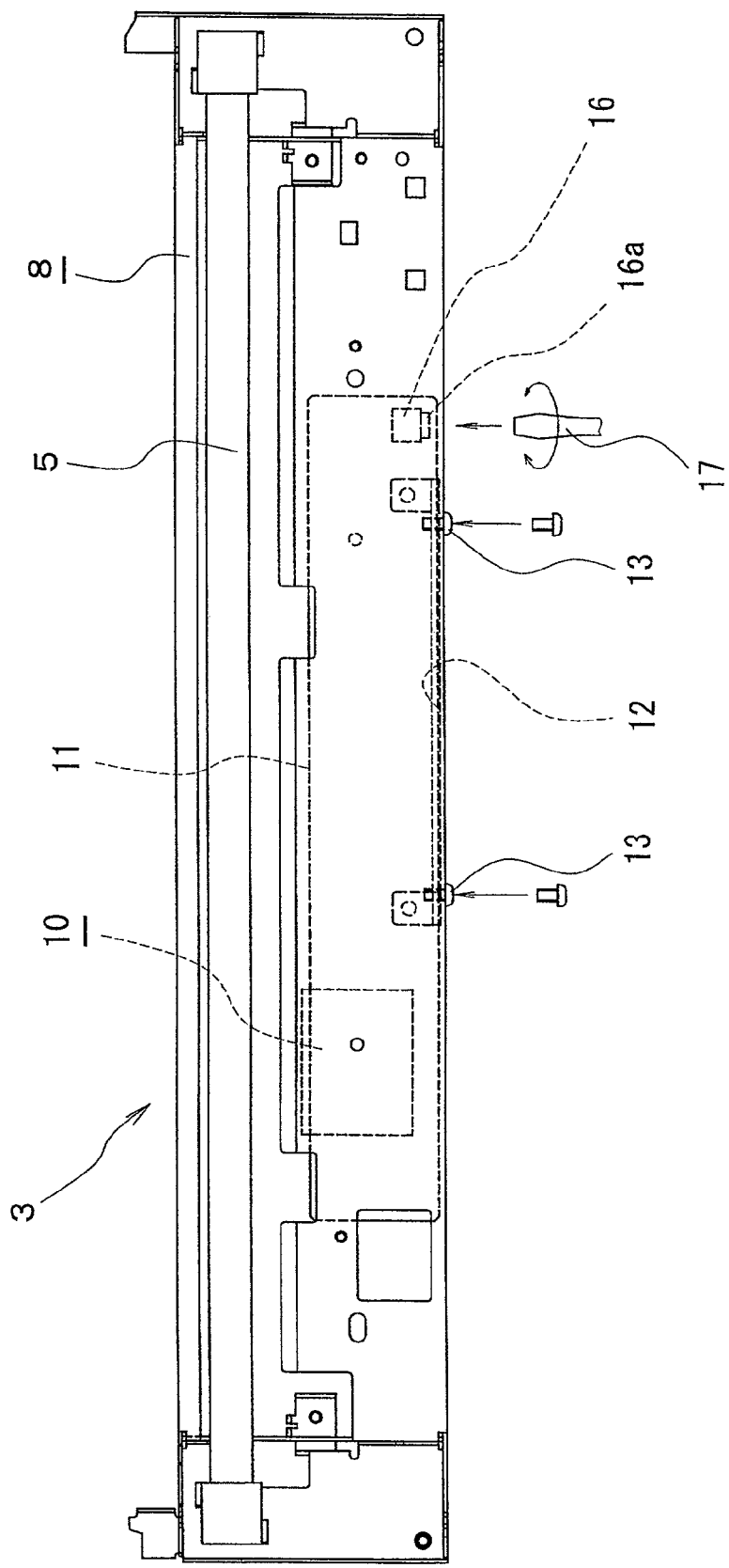
FIG. 1 is a top plan view of a carriage having a mounting structure for an inverter circuit board for a light source lamp according to the present invention.
Figure 2:
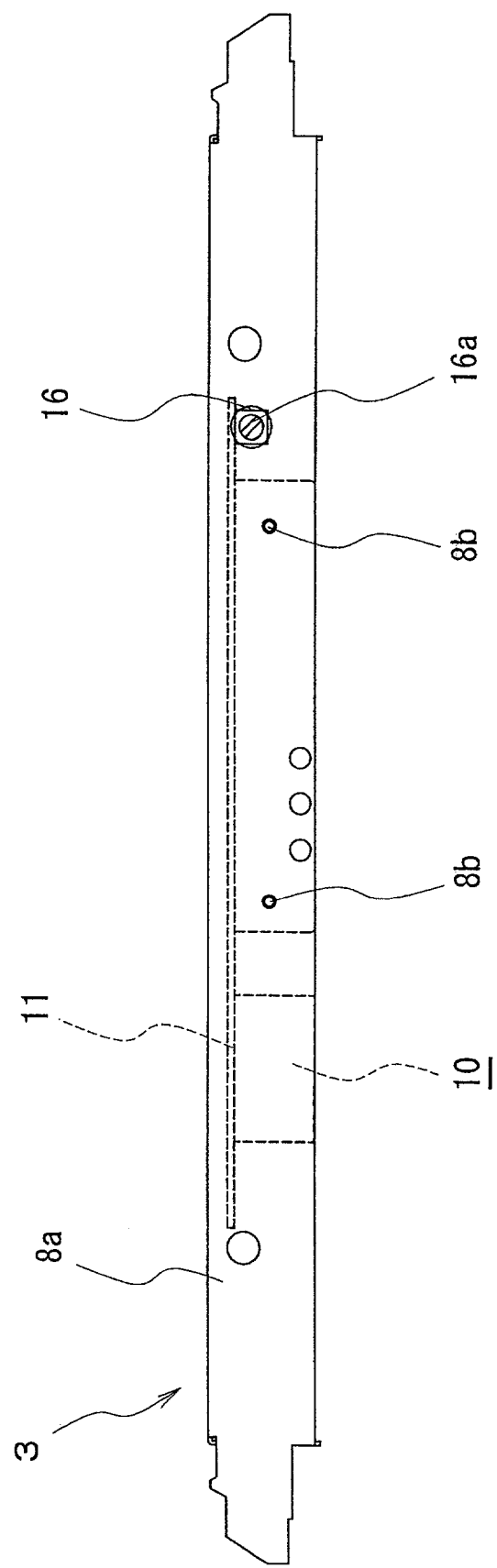
FIG. 2 is a front view of the carriage having the mounting structure for an inverter circuit board for a light source lamp according to the present invention.
Figure 3:
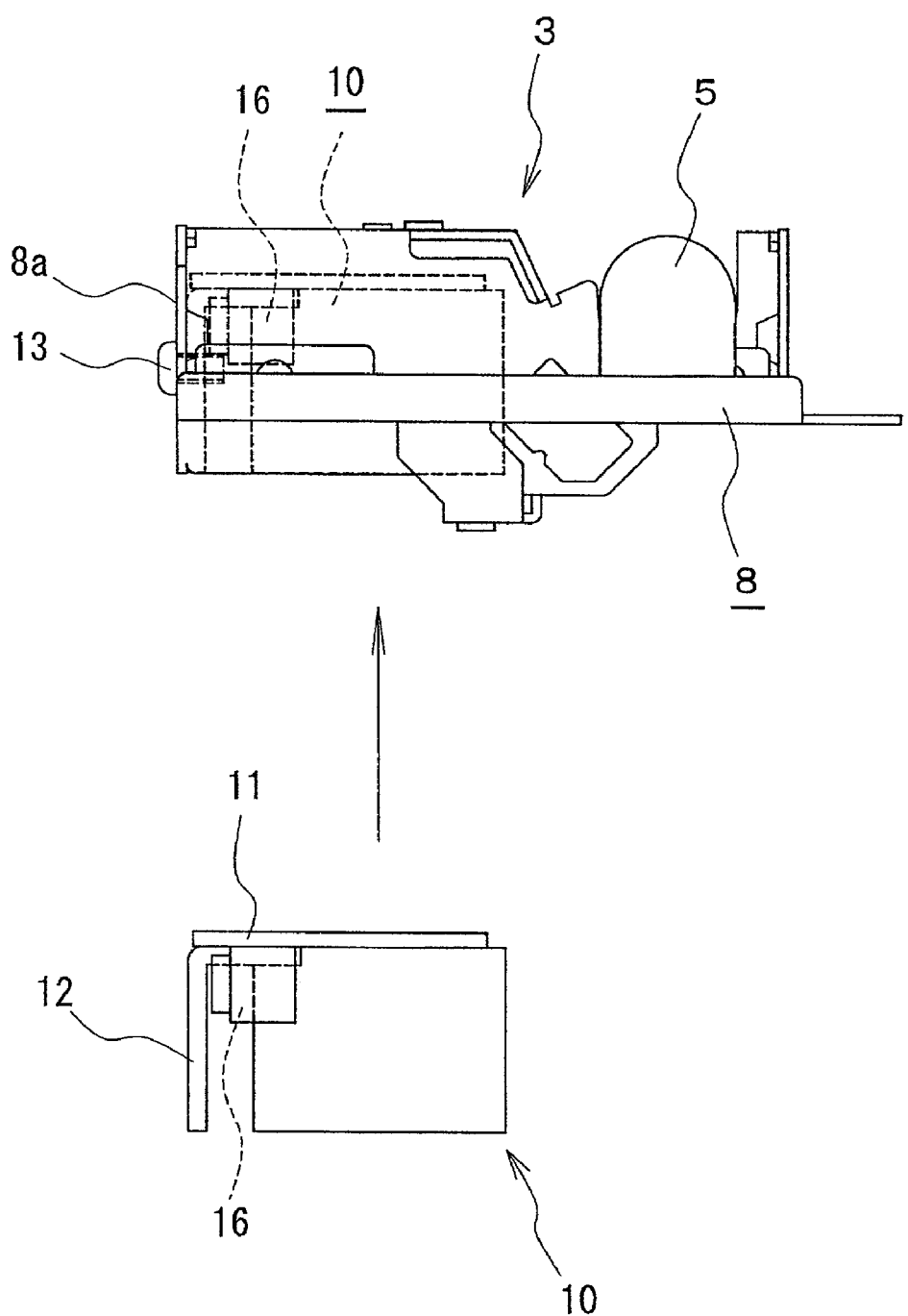
FIG. 3 is a right side exploded view of the carriage having the mounting structure for an inverter circuit board for a light source lamp according to the present invention, and includes the inverter circuit prior to mounting.

The full rate carriage 3, which mounts on the light source lamp 5, also carries an inverter circuit for driving the light source lamp 5. FIG. 1 is a top plan view of the full rate carriage 3, FIG. 2 is a front view thereof, and FIG. 3 is a side view which includes the inverter circuit 10 before it is mounted. The full rate carriage 3 whose frame 8 is appropriately formed, carries the light source lamp 5 (FIGS. 1 and 3) and the inverter circuit 10 on the frame 8.

The inverter circuit 10 is assembled on an inverter circuit board 11 (FIG. 3), which is mounted on a heat dissipation plate 12, as seen in FIG. 3. The heat dissipation plate is mounted by fixing screws 13 (FIG. 1) which extend through holes 8b (FIG. 2) formed in the front side wall 8a of the frame 8. The inverter circuit 10 and the light source lamp 5 are conventionally connected by an electrical cable and connector, which are not shown. Further, a variable resistor 16 (FIGS. 2 and 3) is mounted to the inverter circuit board 11 and serves as light beam intensity adjusting means. An operating portion 16a thereof is clear of the front side wall 8a, as best seen in FIG. 2.

The effects of the mounting structure for the inverter circuit board 11 for the light source lamp 5 for an image reader having a structure according to the embodiment of the present invention illustrated in FIGS. 1 to 3 is now described. When the inverter circuit 10 is to be removed from the full rate carriage 3 for the purpose of being replaced or the like, the connector which connects the inverter circuit 10 to the light source lamp 5 is removed, and then the fixing screws 13 are loosened and removed. The heat dissipation plate 12 and the inverter circuit board 11 can then be removed together. Also, the inverter circuit board 11 may be removed from the heat dissipation plate 12 and, the inverter circuit board 11 having assembled thereon the new inverter circuit 10, can be mounted to the heat dissipation plate 12.

This heat dissipation plate 12 is then fixed to the front side wall 8a by tightening the fixing screw 13.

In order to adjust the light beam intensity of the light source lamp 5, as illustrated in FIG. 1, a tool 17 such as a screwdriver can be used to turn the operating portion 16a of the variable resistor 16. As a result, the resistance value of the variable resistor 16 can be changed, and the intensity of the light beams from the light source lamp 5 is thereby changed. The resistance value can therefore be adjusted such that the light beam intensity is appropriate.

Figure 4:
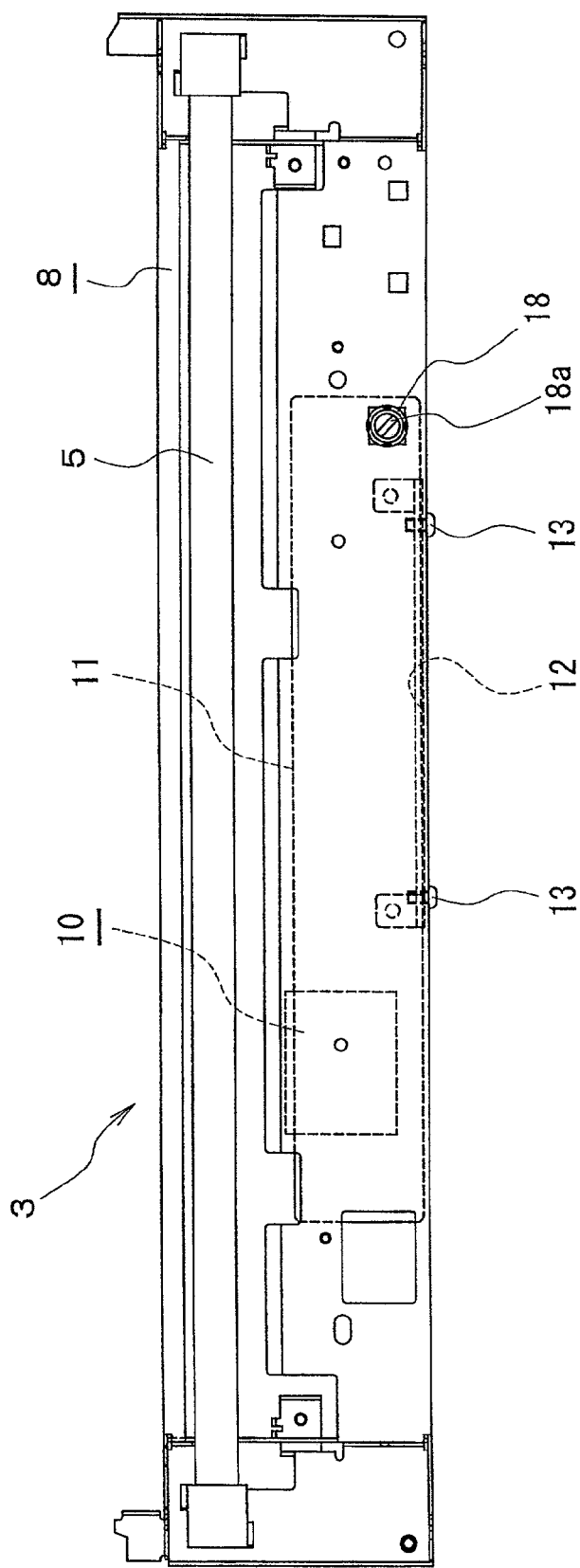
FIG. 4 is a top plan view of a carriage having a mounting structure for an inverter circuit board for a light source lamp according to another embodiment of the present invention.
Figure 5:
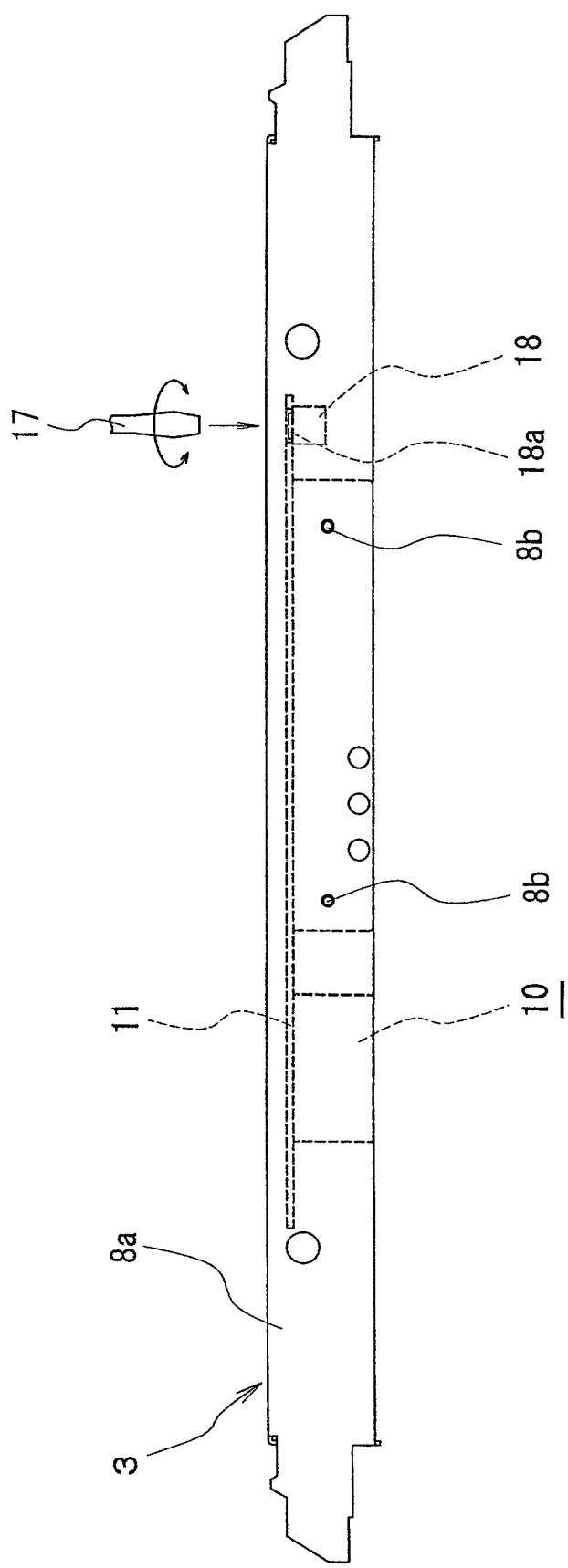
FIG. 5 is a front view of the carriage having the mounting structure for an inverter circuit board for a light source lamp according to the embodiment of the present invention shown in FIG. 4.
Figure 6:
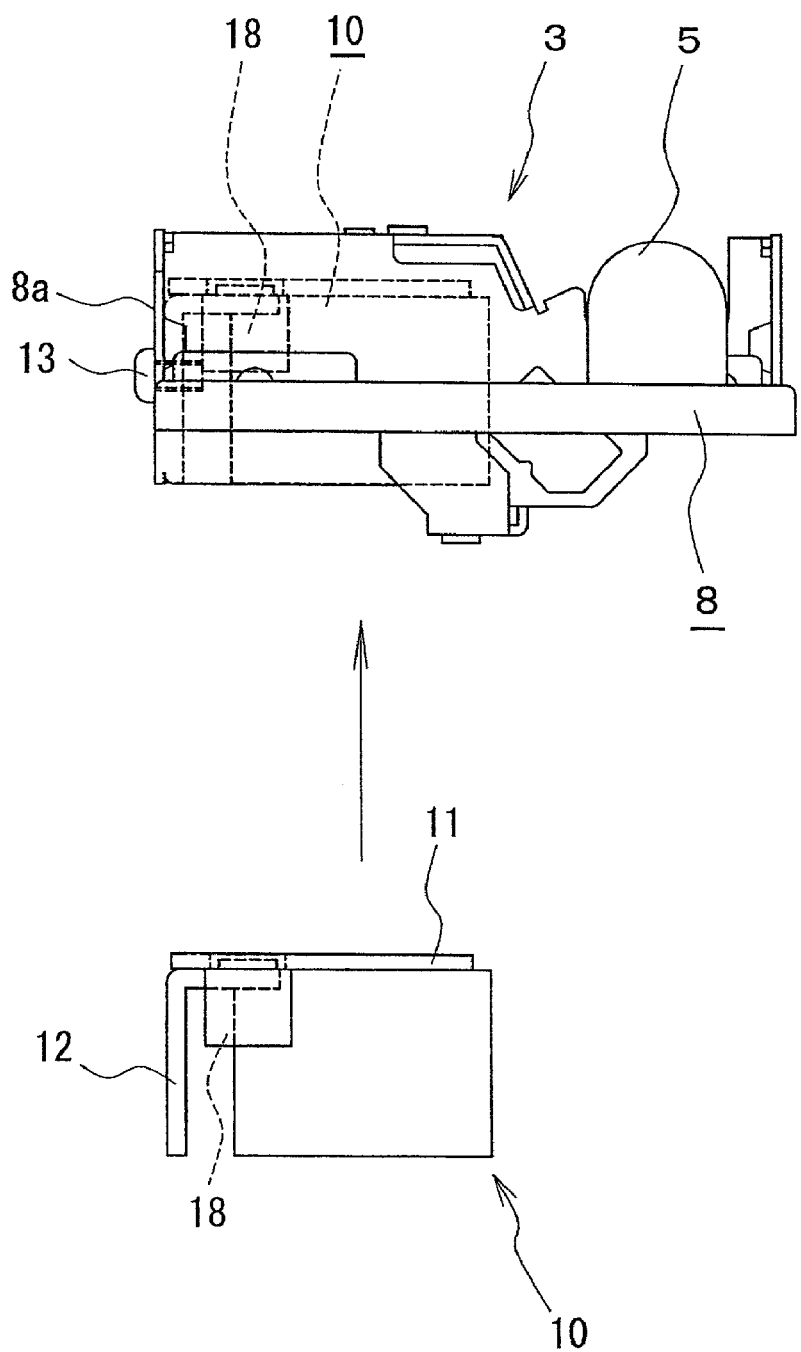
FIG. 6 is a right side exploded view of the carriage having the mounting structure for an inverter circuit board for a light source lamp according to the embodiment of the present invention, and includes the inverter circuit prior to mounting.

Another embodiment of the present invention is described in FIGS. 4 to 6. In these FIGS., the parts which are the same as those of the embodiment illustrated in FIGS. 1 to 3 are assigned the same numbers, and thus descriptions thereof are omitted. In this embodiment, a variable resistor 18 is mounted as the light beam adjusting means, to the inverter circuit board 11. The variable resistor 18 is a part of the inverter circuit board 11, and a through-hole is formed in the portion of the inverter circuit board 11 to which the variable resistor 18 is mounted. An operating portion 18a of the variable resistor 18 is exposed through this through-hole.

In the embodiment illustrated in FIGS. 4 to 6, in order to adjust the light beam intensity of the light source lamp 6, as illustrated in FIG. 5, a tool 17 such as a screwdriver can be used from above the full rate carriage 3, to turn operating portion 18a of the variable resistor 18. As a result, the resistance value of the variable resistor 18 is changed, and the intensity of the light beams from the light source lamp 6 is thereby changed to an appropriate level.

As described above, in the mounting structure for the inverter circuit board for a light source lamp for an image reader according to the present invention, the inverter circuit board can be removed from the carriage if the mounting means for the inverter circuit board is applied by operating the mounting means from the direction of movement of the carriage. Further, when the inverter circuit board is to be mounted, it can be mounted by operating the mounting means from the direction of movement of the carriage. As a result, when the inverter circuit is to be replaced, there is no need to remove the carriage from the main body. In addition, it becomes unnecessary to mount the carriage into the main body again after having removed it, and thus it is not necessary to carry out adjustment work after the carriage has been mounted once again. Accordingly, the labor of replacing the inverter circuit is reduced.

Further, a heat dissipation plate is mounted on the carriage at an end portion at a side in the direction in which the carriage moves. The circuit board is mounted so as to be removable from the heat dissipation plate, and thus, the heat dissipation plate causes dissipation of heat generated by the inverter circuit to be accelerated, and thus the inverter circuit can be effectively cooled. Accordingly, even when a high intensity light source lamp is required, the inverter circuit can be stably operated. Since operation of the means adjusting the light beam intensity of the light source lamp can be carried out from the direction of movement of the carriage, or from above the carriage, the work of adjusting the intensity of the light beams can be easily carried out.

In addition, according to the mounting structure for the inverter circuit board for a light source lamp for an image reader in which operation of the means for adjusting the intensity of the light beams of the light source lamp can be carried out from the direction of movement of the carriage or from above the carriage, and also the mounting means for mounting the inverter circuit board having the inverter circuit for the light source lamp installed on the carriage can be operated from the direction in which the carriage moves.

As a result, the labor of replacing the inverter circuit can be carried out easily, and also the labor of adjusting the intensity of the light beams from the light source lamp can be done easily.

Further, according to the mounting structure for the inverter circuit board for a light source lamp for an image reader, in which operation of the means for adjusting the intensity of the light beams of the light source lamp can be carried out from the direction of movement of the carriage or from above the carriage, and a heat dissipation plate is mounted to the carriage at an end portion thereof at the side in the direction of movement of the carriage, and the inverter circuit board is mounted to the heat dissipation plate so as to be removable therefrom. Thus, the inverter circuit board can be operated from the direction of movement of the carriage, and the heat dissipation plate causes heat generated by the inverter circuit to be effectively dissipated. Accordingly, even if a high intensity light source lamp is required, the inverter circuit can be stably operated.

It will become apparent to those skilled in the art that various modifications to the preferred embodiment of the invention as described herein can be made without departing from the spirit or scope of the invention as defined by the appended claims.

What is claimed is:

1. A mounting structure for an inverter circuit board for a light source lamp of an image reader comprising:
    a carriage having ends which move along an original placed on a platen glass;
    a light source lamp on said carriage whose light beams are moved along the original such that the original is sequentially irradiated, and the light beams reflected on the original are picked up and an image formed on the original is read; and
    mounting means for removably mounting an inverter circuit board having an inverter circuit for said light source lamp installed thereon on a heat dissipation plate on an end of said carriage, such that said mounting means is accessed from the direction in which said carriage moves.

2. A mounting structure for an inverter circuit board for a light source lamp of an image reader comprising:
    a carriage having ends which move along an original placed on a platen glass;
    a light source lamp on said carriage whose light beams are moved along the original such that the original is sequentially irradiated, and the light beams reflected on the original are picked up and an image formed on the original is read;
    mounting means for mounting on an end of said carriage an inverter circuit board having an inverter circuit for said light source lamp installed thereon, such that said mounting means is accessed from the direction in which said carriage moves; and
    a heat dissipation plate mounted to said end of said carriage in the direction in which said carriage moves, wherein said circuit board is removably mounted to said heat dissipation plate.

3. A mounting structure for an inverter circuit board for a light source lamp of an image reader comprising:
    a carriage having ends which move along an original placed on a platen glass;
    a light source lamp on said carriage whose light beams are moved along the original such that the original is sequentially irradiated, and the light beams reflected on the original are picked up and an image formed on the original is read;
    mounting means for removably mounting an inverter circuit board having an inverter circuit for the light source lamp installed thereon to a heat dissipation plate arranged such that said mounting means can be accessed from above said carriage; and
    an intensity adjusting variable resistor coupled to said light source lamp for adjusting the intensity of the light beams from said light source lamp.

4. A mounting structure for an inverter circuit board for a light source lamp of an image reader comprising:
    a carriage having ends which move along an original placed on a platen glass;
    a light source lamp on said carriage whose light beams are moved along the original such that the original is sequentially irradiated, and the light beams reflected on the original are picked up and an image formed on the original is read; and
    mounting means for mounting on said carriage an inverter circuit board having an inverter circuit for the light source lamp installed thereon arranged such that said mounting means is accessed from above said carriage, wherein said inverter circuit board includes intensity adjusting means for the light source lamp which is accessed from the direction in which the carriage moves.

5. The mounting structure for an inverter circuit board for a light source lamp of an image reader as defined in claim 4, wherein a heat dissipation plate is mounted to an end of said carriage in the direction in which the carriage moves, and the circuit board is removably mounted to the heat dissipation plate, and thus the circuit board is operated from the direction in which the carriage moves.

6. A mounting structure for an inverter circuit board for a light source lamp of an image reader, the image reader comprising:
    a carriage which moves along an original placed on a platen glass;
    a light source lamp mounted on said carriage whose light beams are moved along the original such that the original is sequentially irradiated, and the light reflected on the original is picked up, and an image formed on the original is read, wherein the improvement comprises:
    an intensity adjusting means for adjusting the intensity of the light beams from said light source lamp from the direction in which the carriage moves, wherein said mounting means for mounting said inverter circuit board having the inverter circuit for the light source lamp installed thereon is accessed from the direction in which the carriage moves; and
    wherein a heat dissipation plate is mounted to an end of said carriage in the direction in which the carriage moves, and the circuit board is removably mounted to the heat dissipation plate, and thus the circuit board is operated from the direction in which the carriage moves.

7. A mounting structure for an inverter circuit board for the light source lamp of an image reader comprising a carriage which moves along an original placed on a platen glass, wherein said carriage includes a light source lamp whose light beams are moved along the original such that the original is sequentially irradiated and are reflected to a reader comprising:
    mounting means for removably mounting an inverter circuit board having an inverter circuit for a light source lamp on a heat dissipation plate on an end of said carriage in a direction in which the carriage moves.

8. A mounting structure for an inverter circuit board for the light source lamp of an image reader comprising a carriage which moves along an original placed on a platen glass, wherein said carriage includes a light source lamp whose light beams are moved along the original such that the original is sequentially irradiated and are reflected to a reader, the mounting structure comprising:

mounting means for mounting the inverter circuit board having an inverter circuit for said light source lamp on an end of said carriage in a direction in which the carriage moves and further including a heat dissipation plate mounted to said end of said carriage in a direction in which the carriage moves, and said circuit board being removably mounted to said head dissipation plate.

9. A mounting structure for an inverter circuit board for the light source lamp of an image reader, the image reader comprising:

a carriage having a top facing a platen glass;

the carriage moving along an original placed on the platen glass, wherein said carriage includes a light source lamp whose light beams are moved along the original such that the original is sequentially irradiated and are reflected to the reader comprising:

mounting means for mounting the inverter circuit board having an inverter circuit for said light source lamp on the top of said carriage.

10. The mounting structure for an inverter circuit board for a light source lamp of an image reader as defined in claim 9 and further including a heat dissipation plate mounted to said top of the carriage and said circuit board being removably mounted to said heat dissipation plate.

* * * * *